(12) United States Patent
Jacobson

(10) Patent No.: US 8,983,657 B2
(45) Date of Patent: Mar. 17, 2015

(54) SYSTEM AND METHOD OF MANAGING VEHICLES DEPLOYED IN A WORKSITE

(75) Inventor: Evan E. Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 362 days.

(21) Appl. No.: 13/222,091

(22) Filed: Aug. 31, 2011

(65) Prior Publication Data

US 2013/0054080 A1 Feb. 28, 2013

(51) Int. Cl.
*G06F 19/00* (2011.01)
*G05B 19/04* (2006.01)
*G05D 1/00* (2006.01)
*G05D 3/00* (2006.01)
*G07C 5/00* (2006.01)
*G06F 11/30* (2006.01)
*B60L 11/18* (2006.01)
*G07C 9/00* (2006.01)

(52) U.S. Cl.
CPC ......... *B60L 11/1822* (2013.01); *G07C 9/00039* (2013.01); *B60L 11/1861* (2013.01); *Y02T 10/7044* (2013.01); *Y02T 10/7005* (2013.01); *Y02T 10/705* (2013.01); *Y02T 10/7072* (2013.01); *Y02T 10/7016* (2013.01); *Y02T 90/124* (2013.01); *Y02T 10/7011* (2013.01); *Y02T 90/14* (2013.01)
USPC .................. 700/245; 700/255; 701/1; 701/2; 701/23; 701/24; 701/25; 701/29.1; 701/29.3; 701/32.3; 701/32.4

(58) Field of Classification Search
USPC ........ 320/106, 109, 115; 701/29.3, 32.4, 1, 2, 701/23, 24, 25, 29.1, 32.3; 700/245, 255; 901/1
See application file for complete search history.

(56) References Cited

U.S. PATENT DOCUMENTS 5,239,931 A * 8/1993 Muselli et al. .................. 104/34
5,612,606 A 3/1997 Guimarin et al.
(Continued)

FOREIGN PATENT DOCUMENTS

CN 101894981 11/2010
CN 101950991 1/2011
(Continued)

OTHER PUBLICATIONS

Materials Transportation Company (MTC) Bulletin PBP-805, Walk-A-Puller portable battery changer, pp. 1-6, Temple, Texas, USA.
(Continued)

*Primary Examiner* — Khoi Tran
*Assistant Examiner* — Robert Nguyen
(74) *Attorney, Agent, or Firm* — Uchendu O. Anyaso

(57) ABSTRACT

A system and a method of managing one or more vehicles deployed in a worksite are provided. The system includes a battery management module which may receive, via a data network, battery health information and/or location co-ordinates from at least one vehicle. The battery management module is configured to issue a battery changing command, via the data network, to a battery-changing device based at least on the battery health information and the location co-ordinates of the vehicles. The battery-changing device may be configured to change at least one battery on the at least one vehicle with charged batteries based on the issued command. The battery-changing device is configured to return each of the changed battery to a central station to recharge the changed battery.

20 Claims, 4 Drawing Sheets

(56) References Cited

U.S. PATENT DOCUMENTS

| | | | | |
|---|---|---|---|---|
| 5,636,122 | A | * | 6/1997 | Shah et al. ................ 701/454 |
| 5,998,963 | A | * | 12/1999 | Aarseth ................... 320/109 |
| 6,014,597 | A | | 1/2000 | Kochanneck |
| 2009/0195219 | A1 | * | 8/2009 | Morita et al. ............. 320/162 |
| 2009/0210736 | A1 | * | 8/2009 | Goff et al. ............... 713/340 |
| 2009/0327165 | A1 | * | 12/2009 | Kaufman ................. 705/500 |
| 2010/0141206 | A1 | * | 6/2010 | Agassi et al. ............. 320/109 |
| 2012/0005031 | A1 | * | 1/2012 | Jammer ................... 705/16 |
| 2012/0303259 | A1 | * | 11/2012 | Prosser .................. 701/400 |

FOREIGN PATENT DOCUMENTS

| | | |
|---|---|---|
| JP | 9795974 | 4/1997 |
| JP | 2008083870 | 4/2008 |
| WO | 2009039454 | 3/2009 |

OTHER PUBLICATIONS

Materials Transportation Company (MTC), Bulletin PBP-805, Intell-A-Changer automatic battery changing robot, pp. 1-6, Temple, Texas, USA.

EBatt Pro (developed by MTC)—Battery monitoring, Brochure, pp. 1-4, Temple, Texas, USA.

EBatt (developed by MTC)—Article, "Analyze this! Motive-Power Batteries in Warehouses", pp. 1-3, Temple, Texas, USA.

Yi-Cheng Wu, Ming-Chang Teng, Yi-Jeng Tsai, "Robotic Docking Station for Automatic Battery Exchanging and Charging", Proceedings of the 2008 IEEE International Conference on Robotics and Biomimetics, Bangkok Thailand, Feb. 21-26, 2009.

Philadelphia Scientific offers iBOS battery Management [online] (retrieved on Jun. 1, 2011) Retrieved from the Philadelphia Scientific website using internet <URL: http://www.phlsci.com/product/2/33>.

* cited by examiner

SYSTEM AND METHOD OF MANAGING VEHICLES DEPLOYED IN A WORKSITE

TECHNICAL FIELD

The disclosure relates to management of vehicles deployed in a worksite, and more particularly, to battery management of the vehicles.

BACKGROUND

A battery used in an electric vehicle gets discharged with time and requires restoration. WIPO Patent Application Publication Number WO2009039454A1 relates to an electric vehicle that determines a status of a battery and a geographic location of the electric vehicle. The electric vehicle then identifies at least one battery service station that can be reached based on the determined charge status of the battery and the geographic location of the electric vehicle. The electric vehicle can then display the at least one battery service station to a user of the electric vehicle.

SUMMARY OF THE DISCLOSURE

In an embodiment, the present disclosure provides a system of managing one or more vehicles deployed in a worksite. The system includes a battery management module, a battery-changing device, and a central station. The battery management module includes a receiving module and an analysis module. The receiving module is configured to receive, via a data network, battery health information from at least one of vehicle. The analysis module is configured to issue a battery changing command, via the data network, based at least on the battery health information. The battery-changing device may be configured to change at least one battery on the at least one vehicle based on the issued command. The central station is configured to receive each changed battery from the battery-changing device, and to perform at least one operation on the changed battery.

In another embodiment, the present disclosure is directed to a method. The method includes receiving, via a data network, battery health information from at least one vehicle deployed in a worksite. The method also includes issuing a battery-change command, via the data network, to at least one battery-changing device based at least in part on the battery health information. The method may include changing a battery, by the battery-changing device, on the at least one vehicle based at least in part on the issued command. The battery-changing device can return each changed batteries to a central station for at least one operation to be performed on the changed battery.

In yet another embodiment, the present disclosure may provide a computer system that has one or more processors to execute the various steps listed above.

Other features and aspects of this disclosure will be apparent from the following description and the accompanying drawings.

DETAILED DESCRIPTION

Figure 1:
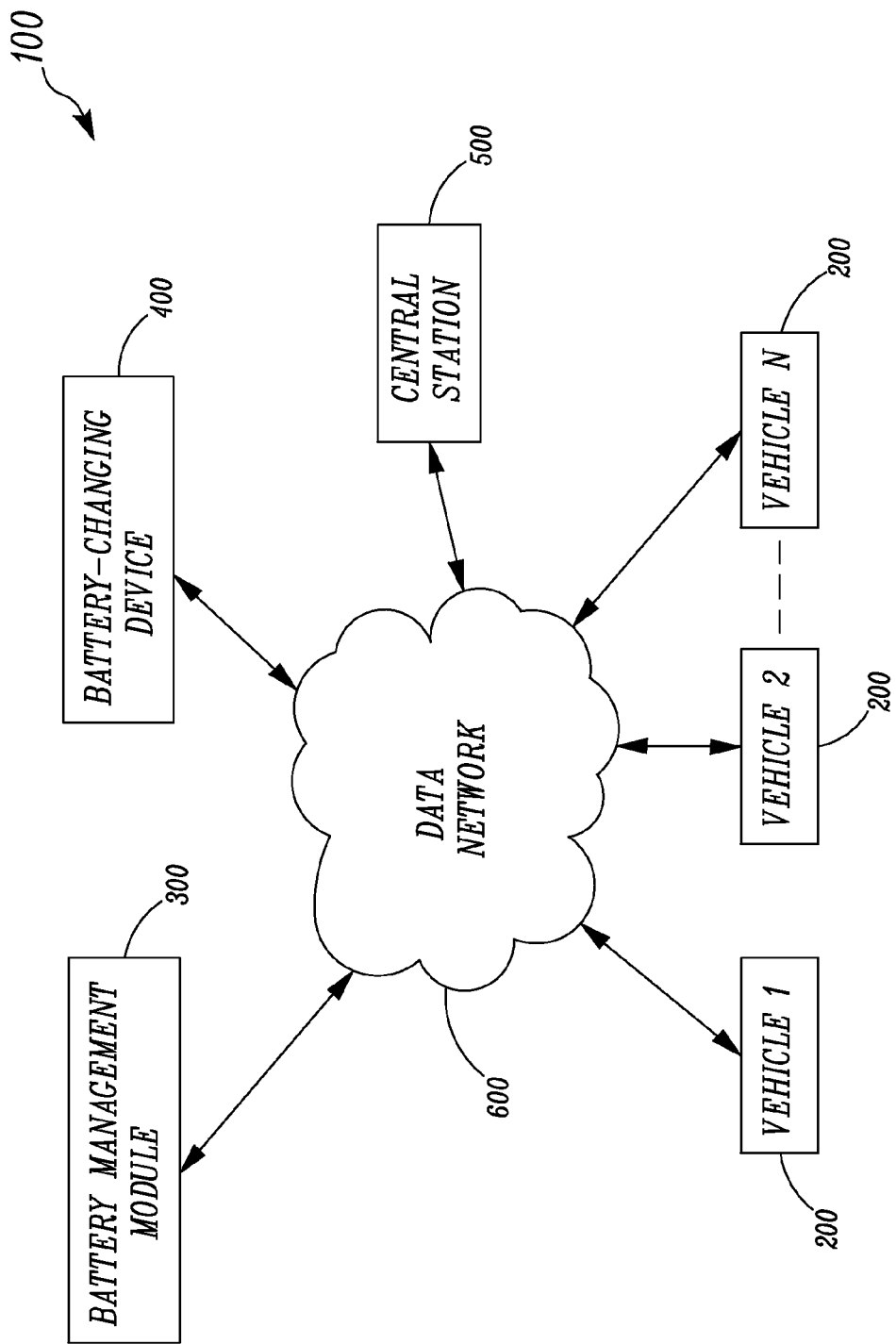
FIG. 1 illustrates a schematic diagram of a system including one or more vehicles deployed in a worksite.

FIG. 1 is a schematic diagram illustrating a system 100 in which the present disclosure may be utilized. The system 100 may include a plurality of vehicles 200, at least one central station 500, at least one battery-changing device 400, and a battery management module 300. The vehicles 200, the central station 500, the battery-changing device 400, and the battery management module 300 may communicate with each other via a data network 600. The data network 600 may include any type of wired or wireless communication network capable of coupling together computing nodes. This includes, but is not limited to, a local area network, a wide area network, or a combination of networks. In an exemplary embodiment, the data network 600 is a wireless data network including: a cellular network, a Wi-Fi network, a WiMAX network, an EDGE network, a GPRS network, an EV-DO network, an RTT network, a HSPA network, a UTMS network, a Flash-OFDM network, an iBurst network, and any combination of the aforementioned networks. In another embodiment, the data network 600 may include the Internet, the Intranet, the Ethernet and the Satellite network.

As illustrated in FIG. 1, the data network 600 is coupled to the vehicles 200, the central station 500, the battery-changing device 400 and the battery management module 300. It may be apparent to a person of ordinary skill in the art that only one central station 500 and one battery-changing device 400 is illustrated for the sake of clarity, but the system 100 may include any number of central stations 500, and battery-changing device 400, etc.

The vehicles 200 may be battery powered earth-moving equipments such as, but not limited to, mining trucks, off-highway trucks, excavators, construction machines, or any other machineries that may utilize batteries as a main power source or as an alternative power source. The vehicles 200 may be operated manually or automatically based on the operation of the vehicles 200. The vehicles 200 may include one or more batteries depending upon the nature of the operation and the requirement. A person of ordinary skill in the art will appreciate that the term "batteries" used herein should be understood in a broad sense encompassing replaceable electrical energy-providing modules of any kind, without limitation, lithium ion batteries, lead-acid batteries, nickel-metal hydride batteries, capacitors, reaction cells (e.g., Zn-air cell), to name a few. The batteries may be re-chargeable in nature and may require to be replaced once the batteries have been discharged or spent.

The vehicles 200 may be deployed in a worksite such as, but not limited to, a construction site, a service station facility, a pre-defined work area, and the like. Specifically, the worksite may define a pre-determined area within which the vehicles 200 may be deployed and/or operate. Moreover, the worksite may be located in a single geographical area. Alternatively, the worksite may also be spread across more than one geographical area, connected to each other by one or more routes. The size and geographical location of the worksite may vary based on the operation and the deployment of the vehicles 200.

Figure 2:
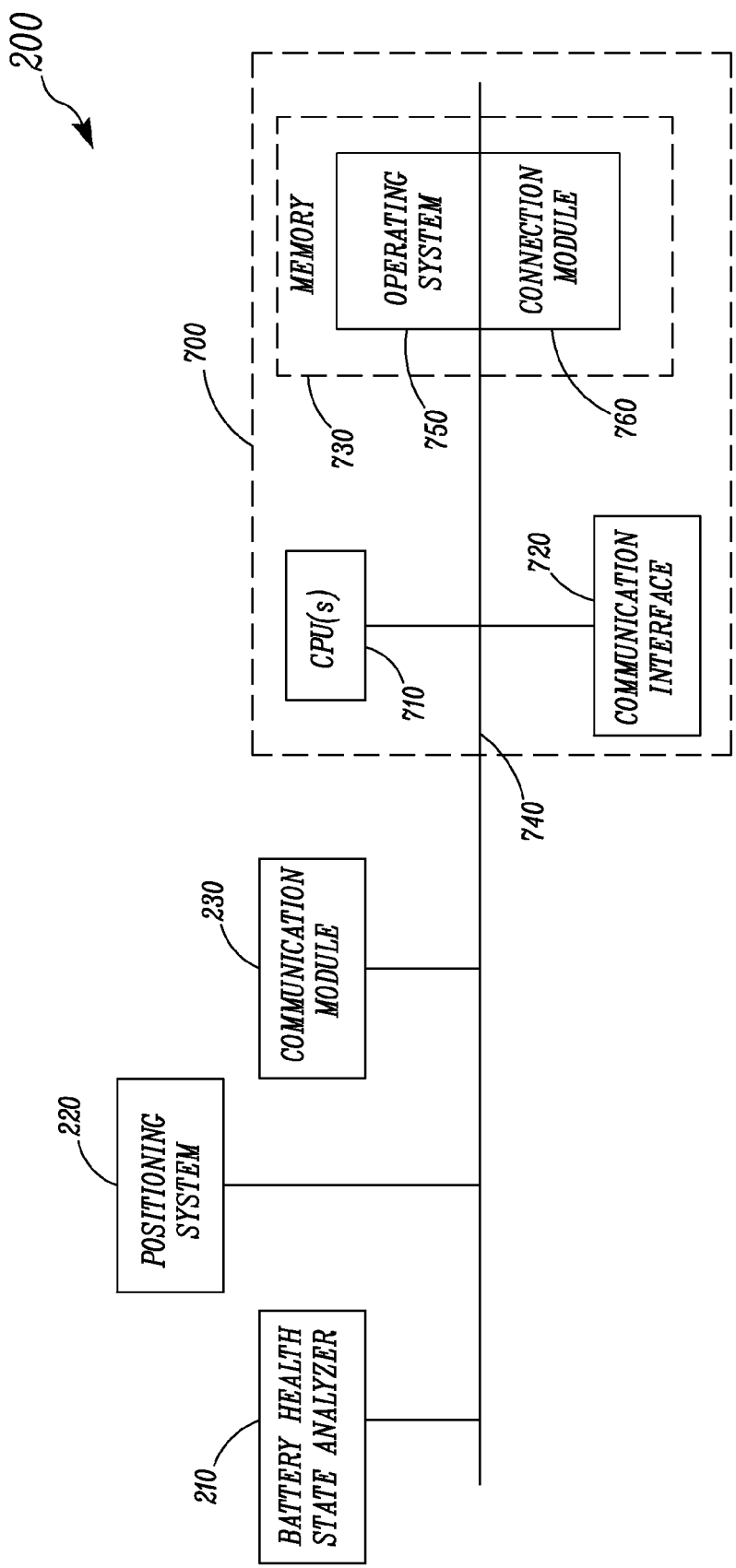
FIG. 2 illustrates a block diagram of a vehicle deployed in the worksite.

As illustrated in FIG. 2, the vehicles 200 may include a battery health state analyzer 210. The battery health state analyzer 210 may be adapted to analyze and gather health information of the batteries installed in the vehicles 200. The battery health information may include, but not limited to, state-of-charge of the battery, an age of the battery, number of charge/discharge cycles of the battery, voltage of the battery, resistance, temperature, current, electric quantity data and a combination of the aforementioned thereof. The battery health information may be a numeric value, a percentage, a decimal value, a status indicator, and the like.

The vehicles 200 may further include a positioning system 220 for determining location co-ordinates of the vehicles 200 within the worksite. The positioning system 220 may include, but not limited to, a satellite positioning system, a Global Positioning system (GPS) a radio tower positioning system, a Wi-Fi positioning system, and any combination of the aforementioned positioning systems. Furthermore, the positioning system 220 may include a navigation system that generates routes and/or guidance and may be enabled to determine and track locations of the vehicles 200 in the worksite.

The vehicles 200 may further include a communication module 230, including hardware and software, for communicating with the battery management module 300. The communication module 230 may be adapted to transmit the battery health information and the location co-ordinates of the vehicles 200 to the battery management module 300. In an embodiment, the vehicles 200 periodically transmit the battery health information and the location co-ordinates of the vehicles 200 to the battery management module 300 via the data network 600. In an exemplary embodiment, the vehicles 200 may send the battery health information and/or the location co-ordinates to the battery management module 300 on request by the battery management module 300. In another exemplary embodiment, any vehicle 200 may transmit the battery health information and/or the location co-ordinates when a charge level of the batteries in that vehicle 200 reaches below a defined threshold or spent battery level or if the battery is functioning abnormally.

Figure 3:
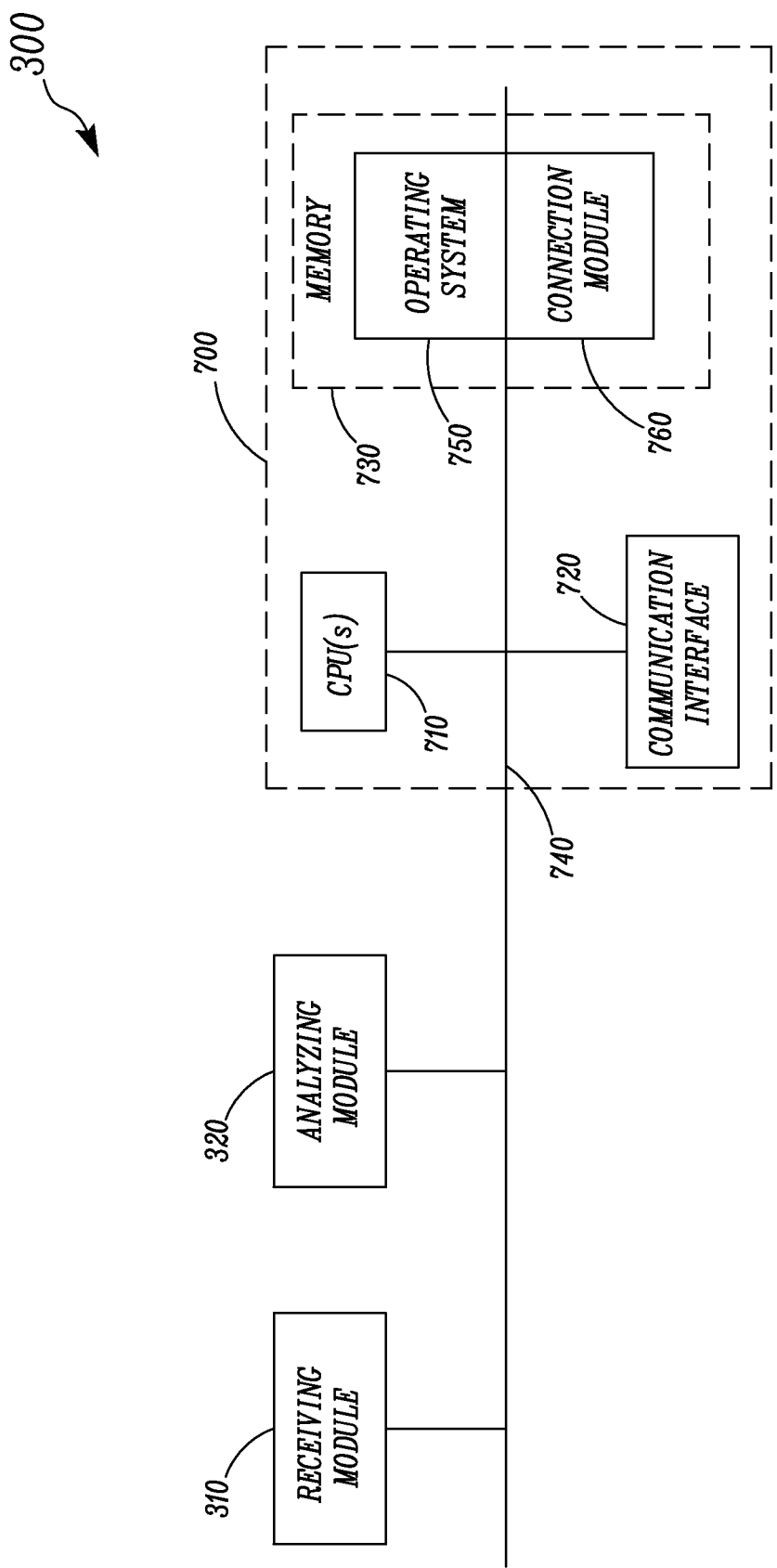
FIG. 3 illustrates a block diagram of a battery management module.

As illustrated in FIG. 3, the battery management module 300 includes a receiving module 310 to receive, via the data network 600, the battery health information and location co-ordinates from at least one of the vehicles 200. The battery health information and/or location co-ordinates may be transmitted and received in any format compatible with both the vehicle 200 and the battery management module 300. In one embodiment, the battery health information and/or the location co-ordinates may be stored in suitable databases or data structures in the battery management module 300 for retrieval at a later stage. The database may also include the additional information of the batteries such as, but not limited to, an age of the batteries, number of charge/discharge cycles of batteries, the history of charge usage, and past and future maintenance schedules and the like.

The battery management module 300 may also include an analysis module 320 adapted to analyze the battery health information received from the vehicles 200. The analysis module 320 may analyze the battery health information using any solutions, known in the art. The analysis module 320 may determine if the charge level of the battery reaches a pre-determined threshold or spent battery level or if the batteries are functioning abnormally. In an exemplary embodiment, when the battery health information of a specific vehicle from the vehicles 200 shows that the charge level of the battery has reached below a pre-determined threshold or if the batteries are functioning abnormally, then the analysis module 320 may subsequently issue a battery-change command to the battery-changing device 400.

In another embodiment, if the battery health information of multiple vehicles 200 shows that the charge level of the batteries have reached below the pre-determined threshold or if the batteries are functioning abnormally, then the analysis module 320 may consider various parameters before issuing the battery-change command for the respective vehicles 200. The various parameters may include, but not limited to, determining an urgency of replacing the batteries in each of the respective vehicles 200, and determining relative locations of the each of the at least one vehicle 200, and the like. The analysis module 320 may receive the battery health information and the location co-ordinates of the respective vehicles 200 from the communication module 230 provided in the vehicles 200.

In an embodiment, the analysis module 320 may provide weights to various parameters such as urgency of replacing the batteries required by the vehicles 200, relative location of the vehicles 200, and the like to determine an optimized path for the battery-changing device 400. The optimized path may enable the battery-changing device 400 to reach the respective vehicles 200 and change/replace the depleted/discharged or abnormal batteries with the charged batteries. Any suitable weighting algorithm may be used without deviating from the scope of the disclosure.

In an embodiment, the analysis module 320 may determine, based on the battery health information, a maximum distance that the respective vehicles 200 can travel before the installed batteries can no longer power the respective vehicles 200. The analysis module 320 may also determine the location of the battery-changing device 400 that is within the maximum distance from the location co-ordinates of the respective vehicles 200. In an exemplary embodiment, the maximum distance may include a specified safety factor (e.g., a 20% margin is added to the maximum distance).

Based on the determination, the analysis module 320 may determine an optimized route plan for the at least one battery-changing device 400 ensuring that the battery-changing device 400 may travel the least distance and also changes the depleted/discharged batteries of the respective vehicles 200 before the batteries may no longer power the respective vehicles 200.

In another embodiment, the analysis module 320 may determine the optimized route for the at least one battery-changing device 400 based on an implementation of the universal travelling salesperson problem. The analysis module 320 may use various algorithms known in art such as, but not limited to Dijkstra's algorithm, Prim's algorithm, Kruskal's algorithm, Floyd-Warshall algorithm, Johnson's algorithm, and the like; that may or may not involve the use of heuristics, to determine the optimized route. The analysis module 320 may utilize the aforementioned algorithms based at least on the need of the environment in which the system 100 is deployed.

In an embodiment, the at least one battery-changing device 400 may be an autonomous vehicle. The battery-changing device 400 may also be a robot or any other self-guided automated device. Since, the battery health information may indicate that batteries of multiple vehicles 200 may need to be replaced with charged batteries, the battery-changing device 400 can be configured to carry multiple charged batteries. Moreover, the battery-changing device 400 may also contain a plurality of containers to house the one or more batteries required by the respective vehicles 200. The shape, size and number of the containers in the battery-changing device 400 may vary.

The battery-changing device 400 may follow the commands issued by the analysis module 320 of the battery management module 300. The command may include the optimized route, determined by the analysis module 320, which needs to be followed by the battery-changing device 400 and the location co-ordinates of the respective vehicles 200 where the depleted/discharged or abnormal batteries need to be replaced with the charged batteries. The battery-changing device 400 may be configured to carry enough charged batteries to replace the batteries of the respective vehicles 200 following the optimized route.

Further, the battery-changing device 400 may also include a global positioning system (GPS) unit or any other positioning system to determine and track the location co-ordinates of the respective vehicles 200 as provided in the optimized route. Moreover, the battery-changing device 400 may include a navigation system such as LORAN in order to guide the battery-changing device 400 to the respective vehicles 200. The battery-changing device 400 is mobile and may move to any location in the worksite using wheels, movable arms, rollers, or any other suitable means without any manual interference. In an embodiment, an operator may remotely control the battery-changing device 400.

The battery-changing device 400 may be capable of moving in the forward or reverse directions in order to reach the respective vehicles 200 based on the received command. The speed of the battery-changing device 400 may be controlled and altered using infrared-based remote control mechanisms or any other technique known in the art. In addition, the battery-changing device 400 may also be fitted with sensors such as, optical sensors, accelerometers, cameras, electromagnetic sensors, position sensors, navigation sensors, and the like.

The battery-changing device 400 may be equipped with at least one robotic arm and/or gripper to facilitate in the easy removal of the discharged and/or abnormal batteries from the respective vehicles 200; and also the re-installation of the charged batteries in the respective vehicles 200.

In an embodiment, the battery-changing device 400 may also be capable of charging the at least one battery it houses while moving towards the respective vehicles 200. One possible method may include, without limitation, charging the batteries with a power source (for example: Internal Combustion Engine) of the battery-changing device 400.

The structure of the battery-changing device 400 may include other features and subsystems without any limitation. A person of ordinary skill in the art will appreciate that the structure of the battery-changing device 400 described herein is merely on an exemplary basis and does not limit the scope of the disclosure. The design of the battery-changing device 400 may be optimized so as to provide a cost-effective, lightweight, easy-to-maneuver automated vehicle to exchange battery assemblies in the worksite. In an embodiment, there may be more than one battery-changing device 400 in the system 100, such that the entire worksite may be divided into different regions for a given battery-changing device 400 to operate in.

As illustrated in FIG. 1, the system 100 also includes the central station 500. The battery-changing device 400 may return the depleted/discharged or the abnormal batteries changed from the respective vehicles 200 to the central station 500. The central station 500 may be configured to perform one or more operations on the changed batteries. In one embodiment, the central station 500 may test the changed batteries for reusability and, if suitable for reuse, place the changed batteries in a charging system that recharges the battery for reuse in vehicles 200.

The batteries not suitable for reuse are separately stored for repair or replacement. In an embodiment, the central station 500 can be configured to repair the abnormal batteries. The central station 500 may also maintain a performance record of all the changed batteries received form the battery-changing device 400 in a database. The performance record may be utilized to test the batteries suitableness for reuse, repair or replacement.

In an embodiment, an internal gas engine fueled from a natural gas pipeline may power the charging system. This may enable the charging system to quickly charge the changed depleted/discharged batteries. Also, the use of natural gas as fuel ensures a clean combustion and thus may minimize any pollutant effect that may arise from the charging of the depleted/discharged batteries. Alternatively, the charging system may include a number of internal combustion engines fueled with any of natural gas, diesel, gasoline and the like. This may enable the charging system to charge the batteries efficiently in case of high load factor. Also, the number of internal combustion engines operating at any instant of time may depend on the number of batteries that needs to be charged at a given instant of time and the capacity of each internal combustion engine. In another embodiment, the charging system may also be coupled to a utility grid, and may receive the necessary power to charge the batteries from the renewable sources such as, but not limited to, solar arrays panels, photovoltaic arrays and the like. This may ensure a clean source of power without any pollutant effects. It may be apparent to a person of ordinary skill in the art that the above methods of powering the charging system are for exemplary purposes only, and the charging system may utilize other technology known in the art to power the charging of the depleted/discharged batteries, without deviating from the scope of the present disclosure.

In an embodiment, the central station 500 contains sufficient storage batteries, or equivalent replaceable or rechargeable modular electric energy units, for powering the vehicles 200. The central station 500 may also provide a self-contained interchangeable module that may be removed and replaced as a unit in the vehicles 200. The central station 500 may store different types of batteries corresponding to different types of the vehicles 200 within the worksite. In an embodiment, the central station 500 may be deployed in the same worksite in which the vehicles 200 are deployed. Alternatively, the central station 500 may be deployed at a suitable different location.

As illustrated in FIG. 2 and FIG. 3, the vehicles 200 and the battery management module 300 may include a computer system 700 having one or more processors 710 (e.g., the CPUs) for executing a set of instructions. For example, the processors 710 may enable the vehicles 200 to transmit the battery health information and/or location co-ordinates of the vehicles 200 which are received by the battery management module 300. The processors 710 may further enable the battery management module 300 to analyze the battery health information and/or location co-ordinates of the vehicles 200 and subsequently issue a battery-change command, where the command may also include an optimized route plan. In an embodiment, the battery-changing device 400 may also include one or more processors, similar to processors 710 as shown for the vehicles 200 in FIG. 2 and the battery management module 300 in FIG. 3. The processors may enable the battery-changing device 400 to follow the commands issued by the battery management module 300 and correspondingly follow the optimized route and change the depleted/discharged or abnormal batteries of the respective vehicles 200. Further, the processors may also enable the battery-changing device 400 to return the changed batteries to the central station 500.

As illustrated in FIG. 2 and FIG. 3, the computer system 700 in the vehicles 200 and the battery management module 300 may typically include one or more processing units 710

(CPUs), one or more network or other communications interfaces 720 (e.g., antennas, I/O interfaces, etc.), memory 730, and respective components of the vehicles 200 (battery health state analyzer 210, communication module 230, positioning system 220) and the battery management module 300 (receiving module 310, analysis module 320), one or more communication buses 740 for interconnecting these components. The communication buses 740 may include circuitry (sometimes called a chipset) that interconnects and controls communications between system components.

Memory 730 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 730 may optionally include one or more storage devices remotely located from the CPU(s). Memory 730, or alternately the non-volatile memory device(s) within memory 730, comprises a computer readable storage medium. In some embodiments, memory 730 stores the following programs, modules and data structures, or a subset thereof: an operating system 750 that includes procedures for handling various basic system services and for performing hardware dependent tasks; a connection module 760 that is used for connecting the vehicles 200 and the battery management module 300 to other computers (for example: computers controlling the battery-changing device 400 and the central station 500) via the one or more communication network interfaces (wired or wireless) and one or more communication networks, such as the Internet, other wide area networks, local area networks, metropolitan area networks, and so on.

The above identified modules or programs (i.e., sets of instructions) need not be implemented as separate software programs, procedures or modules, and thus various subsets of these modules may be combined or otherwise re arranged in various embodiments. In some embodiments, memory may store a subset of the modules and data structures identified above. Furthermore, memory 730 may store additional modules and data structures not described above.

Although FIG. 2 and FIG. 3 each show a respective computer system, FIG. 2 and FIG. 3 are intended more as functional descriptions of the various features, which may be present in a set of computer systems than as a structural schematic of the embodiments described herein. In practice, and as recognized by those of ordinary skill in the art, items shown separately could be combined and some items could be separated. For example, some items shown separately in FIG. 2 and FIG. 3 could be implemented on single computer system and single items could be implemented by one or more computer systems.

The actual number of computer systems used to implement a respective computer system 700 and how features are allocated among them will vary from one implementation to another, and may depend in part on the amount of data traffic that the system 100 must handle during peak usage periods as well as during average usage periods. Moreover, other components of the system 100 such as, the battery-changing device 400 and the central station 500 may have a respective computer system or the functional abilities of these components may be controlled through a single computer system used for all the components of the system.

A person of ordinary skill in the art will appreciate that the system 100 described above is on an exemplary basis. The system 100 may also include a number of other substations to manage, monitor, and perform other maintenance and service functions related to the vehicles 200 that are not shown in FIG. 1, without deviating from the scope and spirit of the disclosure.

Industrial Applicability

The vehicles 200 such as, but not limited to, mining trucks, off-highway trucks, excavators, construction machines, or any other machineries may be deployed in the worksite for carrying out various operations. The vehicles 200 may be battery powered vehicles 200 that may utilize batteries as a main power source or as an alternative power source. In one case, the batteries of the vehicles 200 may be sized for a shift-worth of work. However, sizing batteries for the shift-worth of work may be impractical due to at least the power requirements and the resultant battery sizes. Thus, in an embodiment, smaller batteries may be employed that are swappable mid-shift of the operation.

Figure 4:
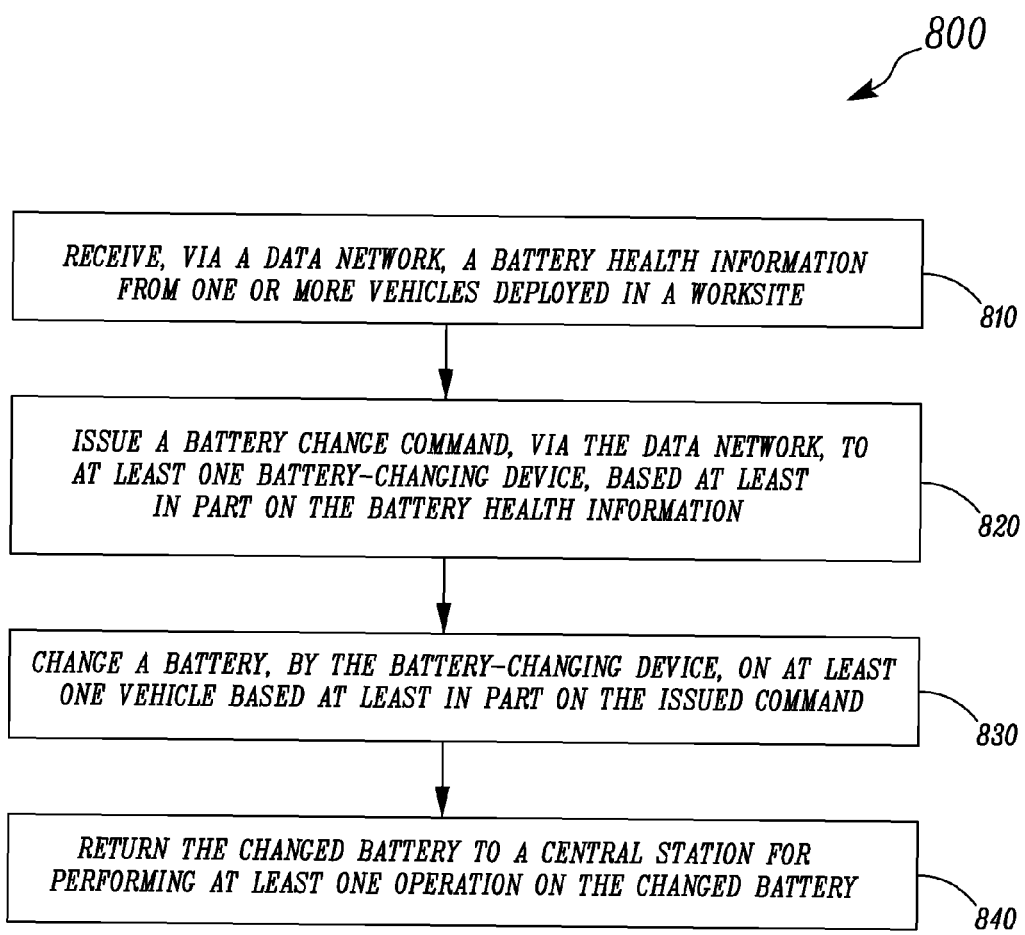
FIG. 4 illustrates a block diagram of a process for managing batteries of vehicles deployed in the worksite.

FIG. 4 illustrates a battery management process 800 for the vehicles 200 deployed in the worksite. In step 810, the battery management module 300 may receive battery health information and/or location co-ordinates from the vehicles 200. The battery management module 300 may be provided in the system 100 to evaluate the conditions of the batteries installed in the various vehicles 200. The vehicles 200 can be enabled to periodically provide health information of the batteries and/or location co-ordinates to the battery management module 300. The battery management module 300 and the vehicles 200 may communicate via the data network 600, and thus may not require any manual interference. The vehicles 200 and the battery management module 300 may be equipped with one or more computer systems 700 having processors 710 to execute the instructions such as transmitting and receiving information.

Since, various vehicles 200 (for example: excavators) have relatively slow travel speeds and thus may not travel quickly to a battery charging/exchanging station, it may be required to provide a mobile battery changing solution for vehicles 200. In step 820, the battery management module 300 may issue a battery change command to the battery-changing device 400 based on the battery health information of the vehicles 200. The battery-changing device 400 may be an autonomous vehicle (for example: robotic vehicle). The battery-changing device 400 may be configured to carry more than one battery per trip, as more than one vehicle 200 may have depleted/discharged or abnormal batteries. In one embodiment, the battery management module 300 may also provide an optimized route to the battery-changing device 400. The optimized route may be based on parameters such as, but not limited to, urgency of replacing the batteries on the vehicles 200 and the relative location of the vehicles 200. The optimized route may enable the battery-changing device 400 to cover all the vehicles 200 that are deployed in the worksite that need a battery exchange.

In step 830, the battery-changing device 400 changes the at least one of the depleted/discharged or abnormal batteries of the at least one of the vehicles 200 with the charged batteries. The battery-changing device 400 may be a mobile vehicle, and thus can change the batteries on the vehicles 200 by travelling to a location of the vehicle 200. The vehicles 200 may continue their operations and do not need to travel to any exchanging or charging station. This may help in saving both time required to complete an operation and the cost involved. Also, as the battery-changing device 400 may follow the optimized route provided by the battery management module 300, the battery-changing device 400 may change the depleted/discharged or abnormal batteries in order of importance to the various vehicles 200 as described above.

In step 840, the battery-changing device 400 may return the changed depleted/discharged and abnormal batteries to the central station 500. The central station 500 may run a test to identify if the changed batteries are suitable for further use. If the batteries are suitable, the central station 500 may be equipped to recharge the discharged batteries and/or rectify the batteries with abnormalities. Since, the charging system may be powered by an internal gas engine fueled from a natural gas pipeline or may be coupled with a utility grid (for example: solar array) to recharge the depleted/discharged batteries, there may be minimal pollutant effect on the environment.

Alternatively, the central station 500 may replace the non-suitable batteries with new batteries. The central station 500 may have a warehouse of batteries that may be utilized in the vehicles 200. In one embodiment, the central station 500 may maintain a record of the performance of the various batteries installed or exchanged from the vehicles 200 in a database. The performance record may be utilized later on to confirm the efficiency and other desired parameters of the batteries.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   receiving, via a data network, battery health information from at least one vehicle deployed in a worksite;
   issuing a battery change command, via the data network, to at least one battery-changing device, based at least in part on the battery health information;
   causing the at least one battery-changing device to travel to a location of the at least one vehicle in response to receiving the issued battery change command;
   changing a battery, by an automated component of the battery-changing device, on the at least one vehicle based at least in part on the issued battery change command;
   causing the at least one battery-changing device to travel to a location of a central station after changing the battery on the at least one vehicle; and
   returning the changed battery to the central station for performing at least one operation on the changed battery.

2. The method of claim 1, wherein the battery health information includes at least one of a state-of-charge of the battery, voltage of the battery, resistance, temperature, current, and electric quantity data of the battery associated with the at least one vehicle.

3. The method of claim 1, wherein the at least one vehicle is at least one of excavator, mining truck, off-highway truck, and construction machine.

4. The method of claim 1, wherein the at least one battery-changing device is an autonomous traveling vehicle.

5. The method of claim 1, wherein the changing of the battery by an automated component of the battery-changing device includes replacing a depleted/discharged battery with a charged battery.

6. The method of claim 1, further comprising:
   determining an optimized route plan for the battery-changing device to travel to a plurality of vehicles based on one or more parameters, wherein the optimized route plan directs the battery-changing device to travel to the plurality of vehicles in a route order that is different than a battery health information order in which battery health information was received from the plurality of vehicles.

7. The method of claim 6, wherein the parameters include a weighted urgency determination of replacing a battery on each of the plurality of vehicles, and relative location co-ordinates of each of the one plurality of vehicles.

8. The method of claim 1, further comprising:
   receiving location co-ordinates from the one or more vehicles.

9. The method of claim 1, wherein the performing of the at least one operation on the changed battery includes at least one of charging the exchanged battery, detecting an abnormality in the changed battery, and rectifying the abnormality in the changed battery.

10. The method of claim 1, wherein the data network includes at least one of a wide area network, a local area network, Ethernet, Internet, Intranet, a cellular network, and a satellite network.

11. A system of managing one or more vehicles deployed in a worksite, comprising:
    a battery management module comprising:
       a receiving module configured to receive, via a data network, battery health information from at least one vehicle; and
       an analysis module configured to issue a battery change command, via the data network, based at least in part on the battery health information;
    a battery-changing device configured to travel to a location of the at least one vehicle and to change at least one battery on the at least one vehicle using an automated component of the battery-changing device, based on the issued command; and
    a central station configured to:
       receive each changed battery from the battery-changing device; and
       perform at least one operation on each changed battery, wherein the battery-changing device is further configured to travel to a location of the central station after changing the at least one battery on the at least one vehicle.

12. The system of claim 11, wherein the analysis module is configured to determine a route for the battery-changing device to travel to a plurality of vehicles based on one or more parameters, wherein the route directs the battery-changing device to travel to the plurality of vehicles in a route order that is different than a battery health information order in which battery health information was received from the plurality of vehicles.

13. The system of claim 12, wherein the parameters include a weighted urgency determination of replacing a battery on each of the plurality of vehicles, and relative location co-ordinates of each of the plurality of vehicles.

14. The system of claim 11, wherein the at least one vehicle communicates location co-ordinates to the battery management module.

15. The system of claim 11, wherein the battery health information includes at least one of a state-of-charge of the battery, voltage of the battery, resistance, temperature, current, and electric quantity data of the battery.

16. The system of claim 11, wherein the at least one vehicle includes at least one of excavator, mining truck, off-highway truck, and construction machine.

17. The system of claim 11, wherein the at least one battery-changing device is an autonomous traveling vehicle.

18. The system of claim 11, wherein the central station is configured to charge the changed battery, detect an abnormality in the changed battery, and/or rectify the abnormality in the changed battery.

19. The system of claim 11, wherein the battery-changing device is configured to carry plurality of charged batteries.

20. A computer based system for managing of one or more vehicles deployed in a worksite comprising:

a communication interface communicating with a memory;

the memory configured to communicate with a processor for managing batteries of the one or more vehicles; and the processor, in response to executing a computer program, performs operations comprising:

receiving, via a data network, battery health information from the at least one vehicle deployed in a worksite;

issuing a battery change command, via the data network, to a battery-changing device, based at least in part on the battery health information;

causing the at least one battery-changing device to travel to a location of the at least one vehicle in response to receiving the issued battery change command;

changing at least one battery, by an automated component the battery-changing device, on the at least one vehicle based at least in part on the issued battery change command;

causing the at least one battery-changing device to travel to a location of a central station after changing the battery on the at least one vehicle; and returning each changed battery to the central station for performing at least one operation on the changed battery.

* * * * *

UNITED STATES PATENT AND TRADEMARK OFFICE
CERTIFICATE OF CORRECTION

| | | |
|---|---|---|
| PATENT NO. | : 8,983,657 B2 | Page 1 of 1 |
| APPLICATION NO. | : 13/222091 | |
| DATED | : March 17, 2015 | |
| INVENTOR(S) | : Evan E. Jacobson | |

It is certified that error appears in the above-identified patent and that said Letters Patent is hereby corrected as shown below:

In the Specification:

Column 8, line 4, delete "Industrial Applicability" and insert -- INDUSTRIAL APPLICABILITY --.

In the Claims:

Column 10, line 7, In claim 7, after "the" delete "one".

Signed and Sealed this
Second Day of August, 2016

Michelle K. Lee
*Director of the United States Patent and Trademark Office*